Feb. 3, 1970 F. G. KELLY ET AL 3,493,765

SPACECRAFT ATTITUDE DETECTOR UTILIZING SOLAR SENSORS AND SUMMATION OF PREDETERMINED SIGNALS DERIVED THEREFROM

Filed Jan. 5, 1967 4 Sheets-Sheet 1

Franklin G. Kelly,
Harry J. Horn,
INVENTORS.
BY.
Edward Dugas
AGENT.

United States Patent Office 3,493,765

Patented Feb. 3, 1970

3,493,765

SPACECRAFT ATTITUDE DETECTOR UTILIZING SOLAR SENSORS AND SUMMATION OF PREDETERMINED SIGNALS DERIVED THEREFROM

Franklin G. Kelly, Long Beach, and Harry J. Horn, Palos Verdes Estates, Calif., assignors to TRW Inc., Redondo Beach, Calif., a corporation of Ohio

Filed Jan. 5, 1967, Ser. No. 607,409

Int. Cl. H01j *39/12, 39/00;* G01j *1/20*

U.S. Cl. 250—209 10 Claims

ABSTRACT OF THE DISCLOSURE

An attitude detector for approximating the attitude of a multi-sided space vehicle with respect to a source of electromagnetic radiation, such as the sun. Radiation sensors are positioned on the sides of the space vehicle. Each side, when illuminated by electromagnetic radiation, provides a unique output signal which is summed to provide a composite signal that approximately resolves the atti- space vehicle.

Background of the invention

This invention relates generally to attitude detectors and more particularly to an attitude detector for a space vehicle which approximately resolves the attitude of the space vehicle with respect to a source of electromagnetic radiation such as the sun.

In the space vehicle art, many devices have been utilized for determining attitude. Sun sensors, in particular, have experienced a fair degree of success in this application. The sun sensors presently in use require an optical system for focussing the rays of the sun onto a photodetector, which in turn provides an output signal indicative of the position of the image of the sun upon the face of the photodetector material.

Most sun sensor systems used for determining the attitude of a space vehicle are quite complex and require considerable data handling capacity, volume, weight and cost. For many applications, less accuracy is quite satisfactory and a simpler, lighter and low cost system requiring minimal data handling capacity such as the one described herein is preferable. The system described herein has the added advantage of being equally suitable for spinning or non-spinning systems or satellites. Most of the less complex sun sensor systems which are available are suitable only for spinning space vehicles. The system proposed herein makes maximum use of components that would normally already exist for other purposes on a space vehicle. For example, the system described herein does not require the addition of sun sensor transducers, tude angle between the electromagnetic source and the but rather makes dual use of the space vehicles solar cell panels, thereby simplifying space vehicle design and reducing cost.

Because sun sensors utilize photodetector materials which have electrical outputs that vary with the ambient temperature as well as with the incident radiation, their outputs make signal processing difficult. It is therefore also highly desirable to provide a device which uses sun sensors and which is temperature-insensitive. The system proposed herein accomplishes this by the nature of the simple electronics. Ideally, such a detector utilizes existing equipment on the vehicle such that the equipment performs a dual function. For example, in the space vehicle art, it is common practice to provide arrays of solar cells for generating electrical power for use in the vehicle. These arrays are generally positioned on the vehicle such that as the vehicle rotates or its attitude changes with respect to the sun, a fairly constant number of cells will be illuminated by the sun, providing a substantially constant level of output power regardless of the vehicle's attiude.

Summary

In a preferred embodiment of the invention, the attitude of an object such as a space vehicle relative to a beam of electromagnetic radiation is determined by affixing a plurality of electromagnetic radiation sensors angularly displaced about an axis of the object such that less than all of the radiation sensors will be in the path of the beam at any one point in time. The output of the radiation sensors indicates which sensors are being irradiated by the beam, thereby providing a relative indication of the attitude of the object's axis with respect to the beam.

It is therefore an object of the present invention to provide an object attitude detector utilizing radiation sensors positioned in predetermined locations on the object, providing an approximate indication of the attitude of the object with respect to a source of radiation.

It is another object of the present invention to provide a space vehicle attitude detector wherein the identity of the sensors sensing radiation provides an indication of the attitude angle of the space vehicle.

It is another object of the present invention to provide a device for detecting a beam of radiation as it traverses a path across the body of a spinning space vehicle.

These and other objects of the invention will become more apparent when taken in conjunction with the following description and drawings in which:

Description of the preferred embodiments

Figure 1:
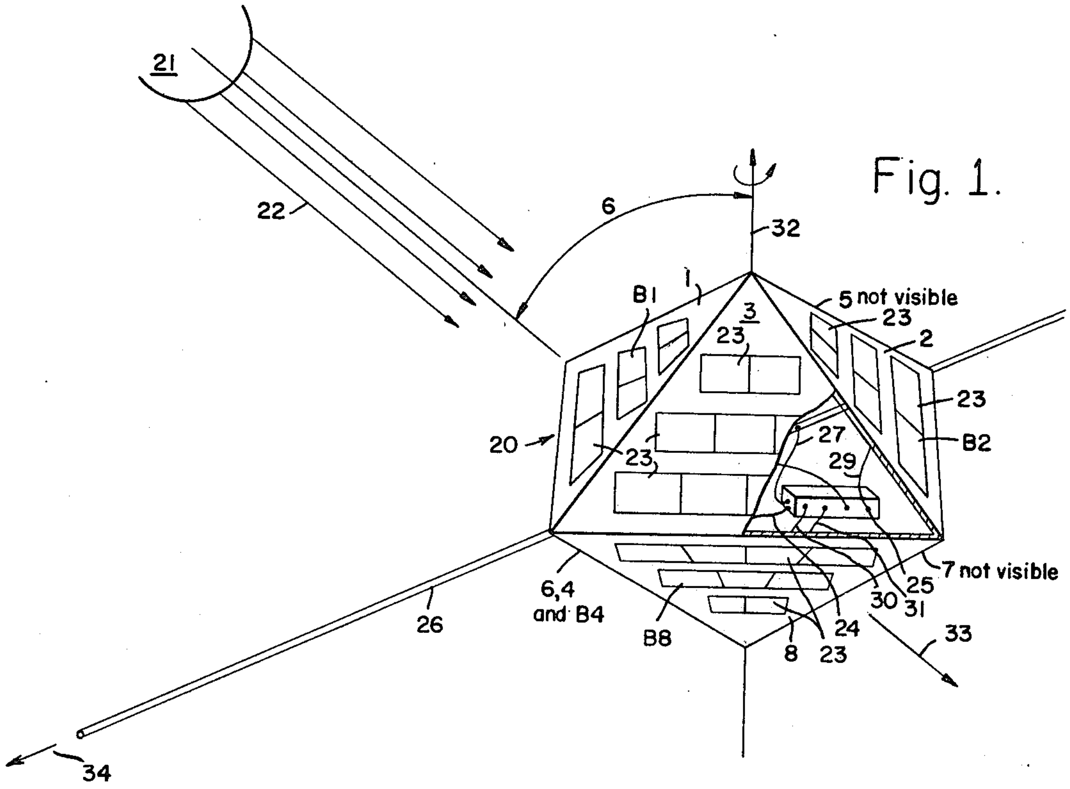
FIGURE 1 is an isometric projection illustration of a space vehicle embodying the present invention and illuminated by electromagnetic radiation from the sun.

Referring to FIGURE 1, a space vehicle 20 in accordance with one embodiment of the invention, is located in a position in space such that it is illuminated by electromagnetic radiation 22 emanating from the sun 21 or another source. The space vehicle 20 is adapted such that it may be spun about the spin axis 32. Although this axis is designated the spin axis, it is to be understood that it is not necessary for certain missions that the vehicle be spun; and therefore, in its limiting case, the spin axis under condition of zero spin will be a reference axis. The radiation 22 from the sun can be represented by a sun vector 33. The angle between the space vehicle's reference axis 32 and the sun vector 33 is designated $\sigma$. The space vehicle 20 has walls 8, the external surfaces of which define a regular octahedron. The internal surfaces of the walls 1 through 8 define a cavity. A plurality of solar cells designated 23, B1, B2, B4 and B8 are disposed and coupled to the exterior surfaces of the walls. Solar cells 23 are connected in series to provide a power source. At least one telemetry antenna 26 passes through the surfaces of the octahedron. A responsive means 25 is positioned within the defined cavity. Solar cell banks B1, B2, B4 and B8 are connected electrically by leads 28, 29, 30 and 31, respectively, to the responsive means 25. The output of means 25 is connected via lead 27 to the telemetry antenna 26. Lead 29 connects the responsive means 25 to the power solar cells 23. The solar cells used on this vehicle may, for example, be silicon solar cells. These cells are responsible to electromagnetic radiation having energy in the visible region of the electromagnetic radiation spectrum, and therefore they are responsive to the energy of sunlight. The solar cells will generate a voltage signal having a magnitude proportional to the intensity of the energy impinging on their surface. The solar cell banks B1, B2, B4 and B8 are mounted on alternate walls of the octahedron. Each of the B-labelled banks may be comprised of a single cell or an array of cells, the only requirement placed on the B-cells being that they provide an electrical signal under the influence of radiation which may be used to activate a switch. When one of the B-labelled cells is illuminated with electromagnetic radiation, it turns on a switch supplying a voltage that is proportional to its number. In the embodiment of FIGURE 1, for example, the voltages are made proportional to the numbers assigned to the walls 1, 2, 4 and 8. To further define this assignment of numbers, when the cell bank B1 is illuminated, it activates a switch which provides a voltage proportional to 1; when B2 is illuminated it activates a switch which provides a voltage proportional to 2, and so on for the remaining B cells. In this case, the voltages are weighted such that they differ from each other by a factor of 2. If two B cells are simultaneously illuminated, their outputs are added; thus, for example, if solar cells B1 and B2 are simultaneously illuminated, the output from the responsive means 25 will be a signal proportional to the number three. For the vehicle configuration of FIGURE 1, a maximum of three B cells can be on at once, providing a number as high as 14 which would be a composite of cells B8 plus B4 plus B2. At least one B cell must be on, which will provide a number as low as one. If the resulting number is a single number or the combination of three numbers, then the triangular cone is described by the intersection of the three planes at an apex of a regular tetrahedron. The acceptance cone is the solid angle defined by the intersections of the four planes shown in FIGURE 3 and within which the sun vector is known to be positioned because of the radiation received by solar cells mounted to the walls of the space vehicle. If it is a combination of two numbers, the acceptance cone is described by the intersection of the four planes at the apex of a regular octahedron. Thus, an instantaneous reading of an integer between 1 and 14 will resolve the sun angle $\sigma$ no better than the included solid angle at a tetrahedron apex and no worse than that of an octahedron.

The B cells may also be connected to the space vehicle's power supply to provide additional power. It is desirable to have the B cells performs this dual function in order to take advantages of the full potential of the cells.

Figures 2A, 2B, 2C, 2D:
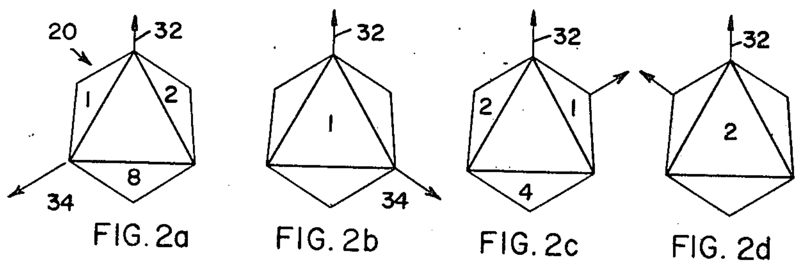
FIGURES 2*a* through 2*d* illustrate in a sequential semi-schematic form the relative positions of the space vehicle with respect to the sun's radiation.
Figures 3A, 3B, 3C, 3D:
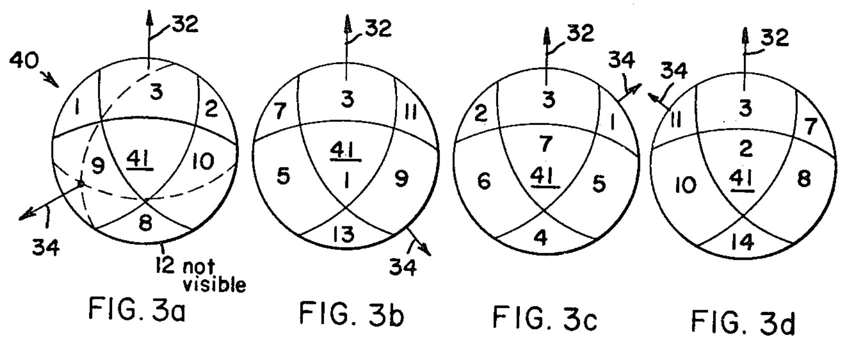
FIGURES 3*a* through 3*d* illustrate the celestial sphere centered at the space vehicle showing intersections of the four detector planes with said sphere.

Referring now to FIGURES 2*a* through 2*d*, and FIGURES 3*a* through 3*d*, wherein like letters of FIGURE 2 and FIGURE 3 represent similar events, the numerals 1, 2, 4 and 8 correspond to the wall sections of the space vehicle 20 on which the solar cells B are positioned. An indexing arrow 34 is positioned at one of the apexes of the octahedron so as to identify the rotation of that apex about the spin axis 32. In the FIGURES 2 and 3, the spin axis 32, for the purposes of simplicity, is shown passing through two opposite apexes of the octahedron. Assuming that the reader's eyes have been substituted for the electromagnetic radiation source 21, then the walls designated 1, 2 and 8 will be illuminated in FIGURE 2*a*, providing an output proportional to the numeral 11. In FIGURE 3*a*, a sphere has been circumscribed around the space vehicle 20 and the spin axis 32 and the reference index arrow 34, superimposed on the sphere to show relative positions. For the space vehicle attitude of FIGURES 2*a* and 3*a*, the radiation from the source will provide an output 11 which will be maintained as long as the source is within the triangular area 41. If the eye of the viewer could be aligned along the axis 34, then cells that would be illuminated would be B1 and B8, providing an output signal proportional to the number 9 which would be maintained as long as the eye of the viewer (radiation source) was within the rectangular area designated 42 on the circumscribed sphere 40. In FIGURE 2*b*, the index arrow 34 has been roted 90° counterclockwise as viewed from above about the spin axis 32. Only the solar cell B1 is now exposed to the electromagnetic radiation from the source. Again projecting planes of the wall portions onto the circumscribing sphere of FIGURE 3*b*, it can be seen that an output signal proportional to the number 1 will be maintained as long as the source remains within the triangular area 41. In FIGURE 2*c*, the index arrow has again been rotated counterclockwise 90°, which places the wall portions 1, 2 and 4 in the path of the electromagnetic radiation. The output of the responsive means 25 will then be a voltage signal proportional to the integer 7 and this integer will remain as long as the sun vector is within the triangular area defined by the triangle 41 in FIGURE 3*c*. In FIGURE 2*d*, the reference arrow 34 has been rotated counterclockwise another 90°, thereby placing the wall portion 2 in the path of the electromagnetic radiation. FIGURE 3*d* shows that in the triangular area 41, the output of the responsive means 25 will remain proportional to 2.

Figures 4A, 4B, 4C, 4D:
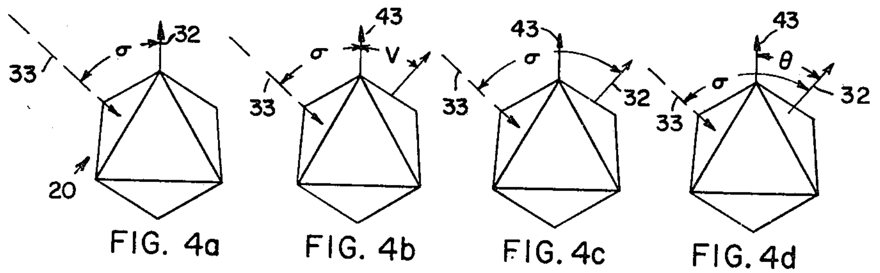
FIGURES 4*a* through 4*d* illustrate various spin actions for the embodiment illustrated in FIGURE 1.
Figures 5A, 5B, 5C, 5D:
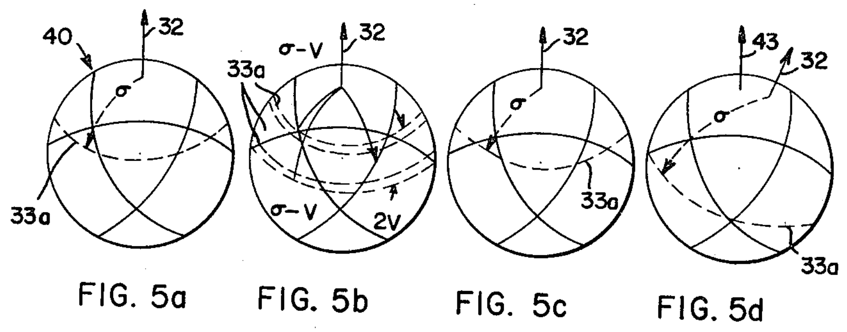
FIGURES 5*a* through 5*d* illustrate the locus of the sun vector on the circumscribed spheres corresponding to the detector planes of the space vehicle of FIGURES 4*a* through 4*d*.

Referring now to FIGURES 4*a* and 5*a*, the sun vectoı 33 intersects the space vehicle 20 at an angle $\sigma$ with respect to the spin or reference axis 32. As the space vehicle rotates about the axis 32, the sun vector 33 describes a right-circular cone intersecting the circumscribed sphere 40 in a non-great circle path for all cases where $\sigma$ does not equal 90°. In FIGURE 4*b*, the space vehicle 20 is shown rotating about its spin axis with the spin axis nutating through an angle $\nu$ about the pole axis 43. On the circumscribed sphere of FIGURE 5*b*, the sun vector, because of the nutation, will trace a path having a high point equal to $\sigma-\nu$ and a low point equal to $\sigma+\nu$. FIGURE 4*c* illustrates the spin axis displaced an arbitrary amount from the pole axis 43. In this particular case, the path **33*a*** shown in FIGURE 5*c* is indistinguishable from the path **33*a*** of FIGURE 5*a*. FIGURE 4*d* illustrates the condition wherein the spin axis 32 is rotated about the pole axis 43 and angle $\theta$. The corresponding locus **33*a* of the sun vector 33** is shown in FIGURE 5*d*.

Figure 6:
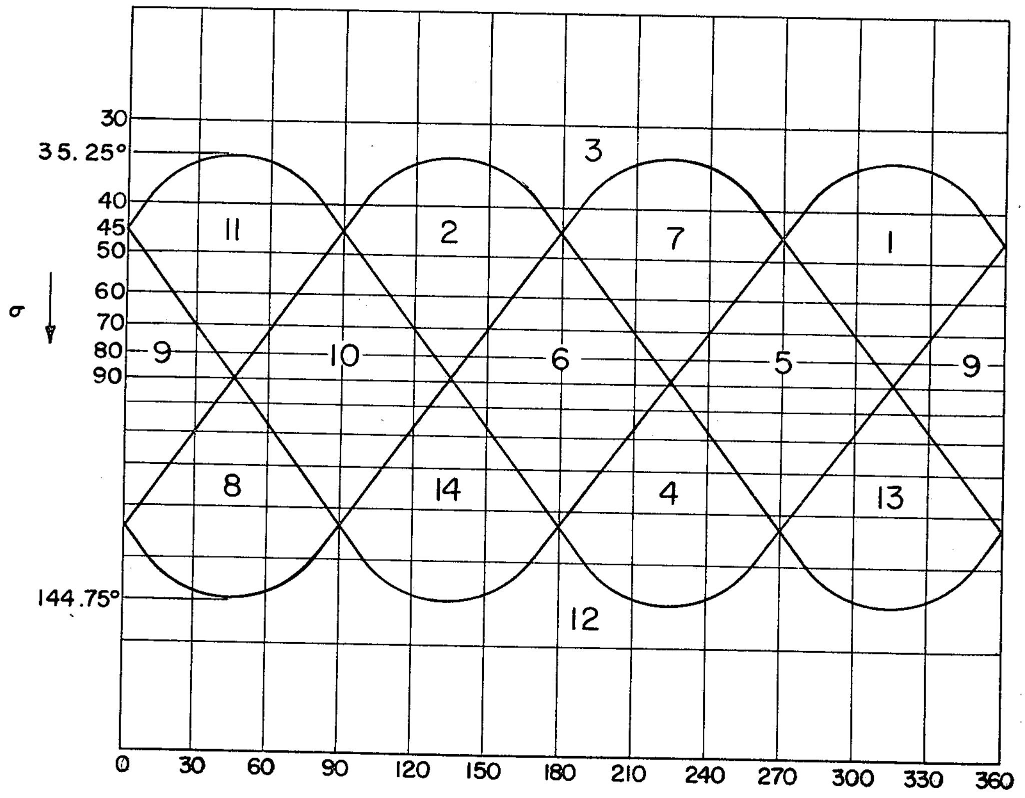
FIGURE 6 illustrates in Mercator projection form the path of the surfaces of the embodiment of FIGURE 1.

Referring now to FIGURE 6, wherein the intersection of the wall planes of the space vehicle with the surface of the circumscribed sphere 40 is displayed as a Mercator projection: when the value of $\sigma$ is between 35.25° and 45°, the $\sigma$ cone intersection with the circumscribed sphere 40, of FIGURES 3 and 5, will appear as a horizontal line crossing through the zones 3, 11, 3, 2, 3, 7, 3 and 1. Similarly, with $\sigma$ having a value greater than 45° and less than 90°, the sequence will be 9, 11, 10, 2, 6, 7, 5 and 1. Each of these sequences will have a sinusoidal proportionality factor.

Figure 7:
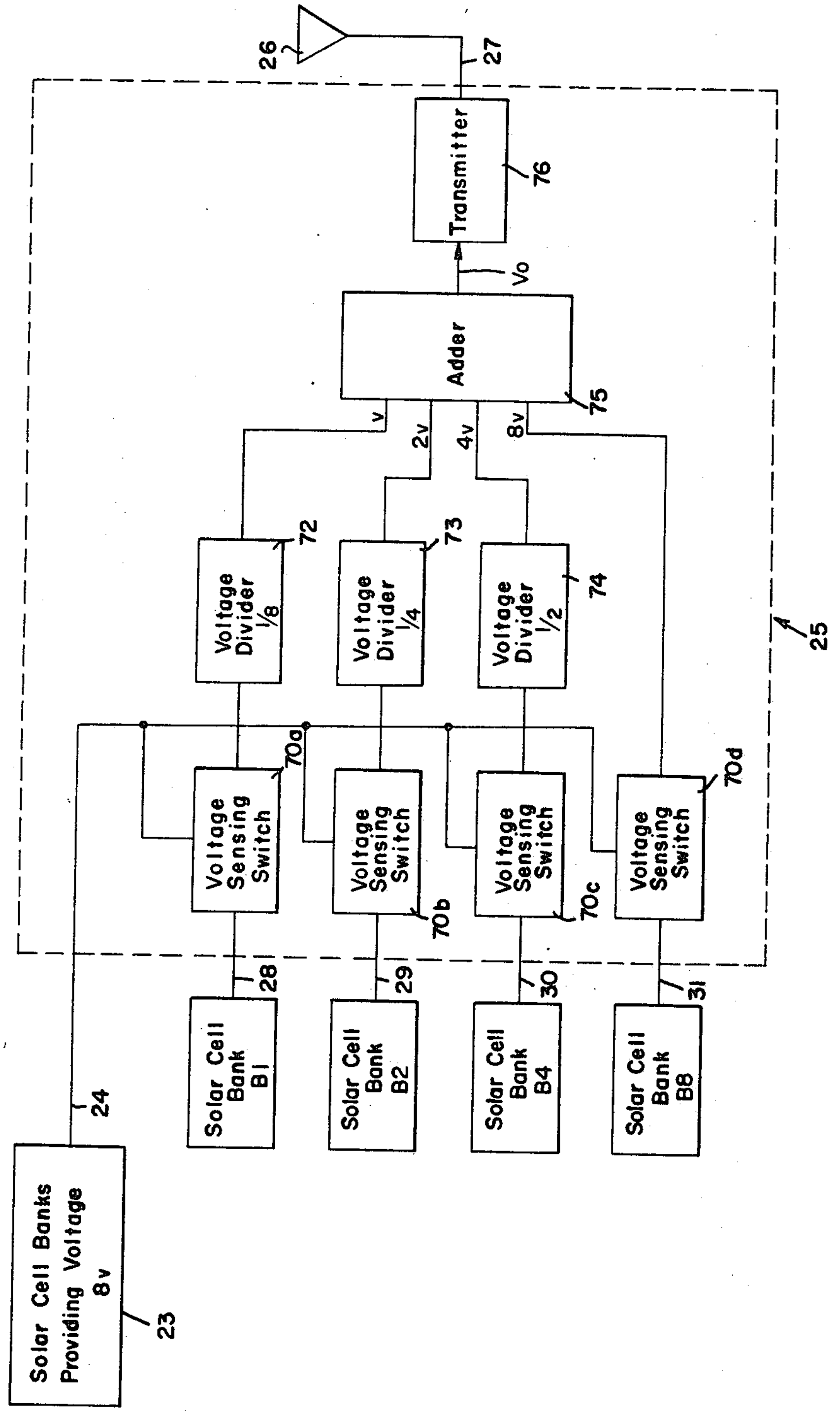
FIGURE 7 is a block schematic diagram of a circuit which may be used in the embodiment of FIGURE 1.

Referring now to FIGURE 7 the solar cells 23 are shown as a block which provides a voltage having a magnitude designated 8V for the purposes of simplifying the discussion. The voltage 8V is applied to the responsive means 25 via electrically conductive lead 24 and more specifically, it is applied to the voltage senstive switches **70*a***, *b*, *c* and *d*, located within the dotted box defining the responsive means 25. The voltage-sensitive switches **70*a***, *b*, *c* and *d* are activated by the output voltage from solar cell banks B1, B2, B4 and B8, respectively. The voltage energizing level of switches 70 may be set to a voltage level much less than the maximum output level obtainable from the solar cell banks such that variations in the temperature environment of the solar cells does not affect the switching levels of the switches. The output from voltage-sensitive switch **70*a* will be the solar cell voltage 8V when the switch is activated. This voltage is applied to a voltage divider 72 which divides it by a factor of 8, providing an output voltage V which is proportional to the number 1. The output of voltage-sensitive switch 70*b* will be a voltage proportional to 8V, which is applied to the voltage divider 73, which in turn divides the voltage by a factor of 4, to provide an output voltage 2V, which is proportional to the number 2. The voltage sensitive switch 70C, when activated, provides an output voltage proportional to 8V, which is applied to the voltage divider 74, which divides that voltage by a factor of 2, to provide an output voltage 4V, which is proportional to the number 4. The output of the voltage-sensitive switch 70*d*, having a magnitude of 8V, is applied directly to the adder 75. The adder 75 sums the voltages from the voltage dividers 72, 73 and 74 and voltage-sensitive switch 70*d* and provides an output signal $V_0$ to modulate the transmitter 76. Transmitter 76 may be of the standard pulse-amplitude modulated type. Lead 27 connects the transmitter 76 to the telemetering antenna 26**.

Figure 8:
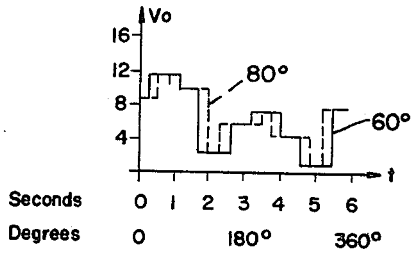
FIGURE 8 illustrates a waveform output of the circuit of FIGURE 7.

Referring now to FIGURE 8, wherein the output voltage $V_0$ is displayed along the ordinate axis and time $t$ in seconds is along the abscissa axis. For the example illustrated, the space vehicle has a spin rate of 10 revolutions per minutes (60°/second) and a complete sampling segment length of five seconds. The waveform is for a $\sigma$ value equal to 60° and the dotted waveform is for a $\sigma$ value equal to 80°.

Regardless of the spin axis a maximum of eight zones will be crossed per revolution. Some may be traversed too rapidly to be determined accurately, but the direction, that is, increases or decreases, will be readily discernible nonetheless, thereby permitting an unambiguous resolution of $\sigma$. A fairly simple analysis of successive segments of data make it possible to determine the position of the spin axis relative to the major poles of the space vehicle as well as the vehicle's nutational rates and their amplitudes.

If the spin axis is at a pole, the $\sigma$ angle vector describes a latitude parallel. This latitude angle is given by:

$$\tan^{-1}\left[1.414 \sin\left(180°\frac{\Delta}{P}\right)\right]$$

or $$\tan^{-1}\left[1.414 \sin\left(45° - \frac{180°\,\square}{P}\right)\right]$$

where

P=period of revolution in seconds;

Δ=number of seconds spent in a triangular zone of sphere 40;

□=number of seconds spent in a square zone of sphere 40.

This calculation can be performed graphically, using the Mercator projection of FIGURE 6. If nutation exists, the latitude angle will change sinusoidally, normally much slower than the rotation rate. If the spin axis is non-polar, a series of straight lines can be fit into the appropriate zones of FIGURE 6 to approximate a sine wave. A transparent overlay can then determine the angular misalignment $\theta$.

Figure 9:
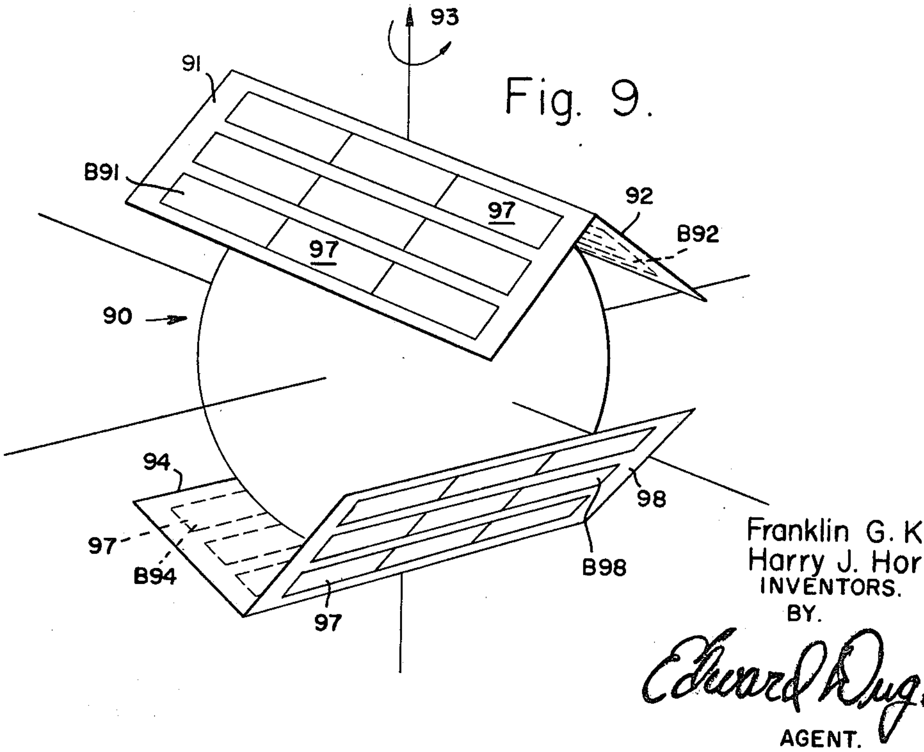
FIGURE 9 illustrates a second embodiment of the present invention.

In FIGURE 9, a second embodiment of the invention is shown wherein the space vehicle is an object 90 with the arbitrary shape of a sphere. The spin axis (reference axis) is designated 93. Flat panels 91, 92, 94 and 98 are fixedly attached to the space vehicle 90 in a tetrahedral orientation. Affixed to each of the panels are the solar cells 97 which are serially connected to provide a source of power. Solar cells B91, B92, B94 and B98 are affixed to panels 91, 92, 94 and 98 respectively. Each of the B cells provides an output which is indicative of the radiation impinging on them.

The output from cells B91, B92, B94 and B98 are fed via leads 28, 29, 30 and 31, respectively, to the responsive means 25 of FIGURE 7, which may be housed within the sphere 90. Less than four panels may be used but resolutions of the $\sigma$ angle will be decreased.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. An attitude detector comprising:

an object, the attitude of which relative to a beam of electromagnetic radiation is to be detected;

a plurality of electromagnetic radiation sensors affixed angularly, displaced about an axis of said object such that less than all of said plurality of radiation sensors will be in the path of said beam at any one point in time;

signal producing means assigned to each of said electromagnetic radiation sensors for producing a predetermined discrete signal when said beam is sensed thereby;

each of said signal producing means providing a signal which differs from but bears a predetermined relationship to that provided by any one of the other signal producing means;

and means for combining the signals from said signal producing means to produce a composite signal indicative of the attitude of said object axis relative to said beam.

2. The invention, according to claim 1, wherein said object has an octahedron shape and said electromagnetic radiation sensors are affixed to alternate surface of said octahedron.

3. The invention, according to claim 1, wherein said object is comprised of a plurality of wall portions, each of said wall portions having interior and exterior surfaces, said interior surfaces defining a cavity and said exterior surfaces substantially defining an octahedron, said radiation sensors affixed to alternate exterior wall portions of said object, said responsive means positioned within said cavity and further comprising;

at least one telemetry antenna affixed to said object;

transmitting means coupling said responsive means to said telemetry antenna for transmitting said output signal.

4. The invention, according to claim 1, wherein said radiation sensors are solar cells.

5. In combination:

an object member having a plurality of wall portions, each of said wall portions having an interior and an exterior surface, said interior surfaces defining a cavity and said exterior surfaces defining an octahedron;

a plurality of spaced solar cells disposed and affixed to said exterior surfaces for receiving electromagnetic radiation and adapted to generate a voltage in response thereto;

means disposed in said cavity, responsive to said voltage from at least one solar cell in alternate surfaces of said wall portions, said voltage responsive means providing a different weighted signal for solar cells of different ones of said alternate surfaces;

means disposed in said cavity adding said weighted signals to provide a composite signal;

at least one telemetry antenna affixed to said object member; and transmitter means coupling said adding means to said telemetry antenna for transmitting said composite signal.

6. The invention, according to claim 5, wherein said solar cells also provide power to said voltage responsive means.

7. An attitude detector comprising:

an object having an axis, the attitude of which relative to a source of electromagnetic radiation is to be detected, and provided with angularly displaced external surfaces;

radiation sensing means positioned on said surfaces;

means identifying the radiation sensing means having electromagnetic radiation impinging thereon, thereby providing relative location of said source of electromagnetic radiation with respect to said object axis;

said identifying means including signal producing means assigned to each of said radiation sensing means for producing a discrete signal of predetermined amplitude when said electromagnetic radiation is sensed thereby, each of said signal producing means providing a signal which differs in amplitude from but bears a definite amplitude relationship to that provided by any one of the other signal producing means, and means for combining the signals from said signal producing means to produce a composite signal indicative of the attitude of said object axis relative to said source of electromagnetic radiation.

8. The invention according to claim 7, wherein said radiation sensing means comprise solar cells.

9. The invention according to claim 8, wherein said signal producing means produce voltage signals that differ in amplitude by a predetermined factor.

10. The invention according to claim 9, wherein said object has the shape of an octahedron, and said radiation sensing means are disposed on alternate surfaces of said octahedron.

References Cited

UNITED STATES PATENTS

| | | | |
|---|---|---|---|
| 3,230,378 | 1/1966 | Hooker | 250—203 X |
| 3,251,995 | 5/1966 | Denner. | |

JAMES W. LAWRENCE, Primary Examiner

E. R. LA ROCHE, Assistant Examiner

U.S. Cl. X.R.

136—206; 244—1; 250—203, 220, 833

UNITED STATES PATENT OFFICE

CERTIFICATE OF CORRECTION

Patent No. 3,493,765 February 3, 197

Franklin G. Kelly et al.

It is certified that error appears in the above identified patent and that said Letters Patent are hereby corrected as shown below:

Column 1, line 20, after "atti-" insert -- tude angle betw the electromagnetic source and the --; line 42, "factory and a simpler, lighter and low cost system requir-" should read -- factory and a simpler, smaller, lighter and low cost system req --; line 52, cancel "tude angle between the electromagnetic sou and the". Column 3, line 59, "performs" should read -- perform line 60, "advantages" should read -- advantage --. Column 4, 1 7, "then cells" should read -- then the cells --. Column 5, li 30, "The waveform" should read -- The solid waveform --. Colum line 38, "surface" should read -- surfaces --.

Signed and sealed this 22nd day of December 1970.

(SEAL)

Attest:

Edward M. Fletcher, Jr. — WILLIAM E. SCHUYLER, JR.

Attesting Officer — Commissioner of Patents